US011884356B2

United States Patent
Chang

(10) Patent No.: US 11,884,356 B2
(45) Date of Patent: Jan. 30, 2024

(54) BICYCLE QUICK RELEASE DEVICE

(71) Applicant: SHUN XIN CO., LTD., Taichung (TW)

(72) Inventor: Chin-Chao Chang, Taichung (TW)

( * ) Notice: Subject to any disclaimer, the term of this patent is extended or adjusted under 35 U.S.C. 154(b) by 739 days.

(21) Appl. No.: 16/924,039

(22) Filed: Jul. 8, 2020

(65) Prior Publication Data

US 2022/0009585 A1 Jan. 13, 2022

(51) Int. Cl.
*B62K 25/02* (2006.01)

(52) U.S. Cl.
CPC .......... *B62K 25/02* (2013.01); *B62K 2206/00* (2013.01)

(58) Field of Classification Search
CPC .............. B62K 25/02; B62K 2206/00; B62K 2025/025; B60B 27/02; B60B 27/023; B60B 27/026; G05G 1/12
USPC ...................................................... 301/124.2
See application file for complete search history.

(56) References Cited

U.S. PATENT DOCUMENTS

| | | | | |
|---|---|---|---|---|
| 5,383,716 A * | 1/1995 | Stewart | ................. | B60B 27/023 301/124.2 |
| 5,791,672 A * | 8/1998 | Masclet | ............... | A61G 5/0825 301/124.2 |
| 5,823,555 A * | 10/1998 | Ashman | ................. | B60B 27/023 301/124.2 |
| 5,865,560 A * | 2/1999 | Mercat | ................... | B62K 25/02 403/DIG. 4 |
| 6,386,643 B1 * | 5/2002 | Marzocchi | ............. | B62K 25/02 301/124.2 |
| 7,090,308 B2 * | 8/2006 | Rose | ...................... | B62K 25/02 301/124.2 |
| 7,556,321 B2 * | 7/2009 | Hara | ...................... | B62K 25/02 301/124.2 |
| 8,573,878 B2 * | 11/2013 | Chang | .................... | B62K 25/02 301/124.2 |
| 8,820,853 B1 * | 9/2014 | Barefoot | ................. | B60B 35/00 301/124.2 |
| 9,132,695 B2 * | 9/2015 | Kuo | ...................... | B60B 27/026 |
| 9,610,803 B2 * | 4/2017 | Schlanger | ............... | B60B 1/003 |
| 2018/0281892 A1 * | 10/2018 | Chang | .................... | B62K 25/02 |

FOREIGN PATENT DOCUMENTS

| | | | | |
|---|---|---|---|---|
| CN | 208198708 | * | 12/2018 | ............. B62K 15/00 |
| FR | 2725128 A1 | * | 4/1996 | ............... A61G 5/10 |
| TW | 201348054 | * | 12/2013 | ............. B62K 25/02 |
| TW | I454400 B1 | * | 10/2014 | ............. B62K 25/02 |

* cited by examiner

*Primary Examiner* — Scott A Browne
*Assistant Examiner* — Eva L Comino

(57) ABSTRACT

The present disclosure relates to a bicycle quick release device. The bicycle quick release device includes: an inner shaft; a lever connected to one end of the inner shaft, the lever being reciprocatively swingable between a release position and an urge position; an outer sleeve provided for the inner shaft to pass through, an outer circumferential face of the outer sleeve being provided with a sleeve body, an abutting portion disposed on one end of the sleeve body and an expansion portion disposed on the other end of the sleeve body, the expansion portion being provided with a plurality of axially extending sectioned grooves; an urging unit disposed between the lever and the abutting portion of the outer sleeve; and a tapered expansion unit connected to the other end of the inner shaft, an outer circumferential face of the tapered expansion unit being provided with a conical face.

5 Claims, 5 Drawing Sheets

BICYCLE QUICK RELEASE DEVICE

TECHNICAL FIELD

The present disclosure relates to the technical field of bicycle parts, and in particular, relates to a bicycle quick release device.

BACKGROUND

A bicycle quick release device is mainly intended to achieve quick engagement and separation between the wheel and the fork body of the frame of a bicycle.

Based on different engagements between the device and the fork body of the bicycle, the bicycle quick release devices are mainly categorized into two types. In the first type, two ends of the device are urgingly engaged on an outer side of the fork body (one end is a screw cap); and in the second type, one end of the device is threaded to the fork body, and the other end of the device is urged. These two types of devices feature their respective merits and applicability.

However, the quick release device that is directly threaded to the fork body is subject to the problem that the tension is difficult to adjust.

In addition, with the quick release device employing the screw cap for urging, the screw cap needs to be first removed before disassembling from the fork body. As such, the screw cap may be prone to loss.

Furthermore, the above two types of quick release devices are both troublesome in terms of assembling and disassembling, which greatly degrades user experience in quick assembling and disassembling.

Still further, for the above two types of quick release devices, part dimensions are all fixed such that replacement is difficult, and thus applicability is poor.

SUMMARY

In view of the above, to improve the related art, and address the problems that tension of the bicycle quick release device is difficult to control, the assembling is troublesome, the parts are prone to loss, and parts in different dimensions may not be used for replacements, the present disclosure relates to a bicycle quick release device. The bicycle quick release device includes: an inner shaft, one end of which is provided with a lever male thread and the other end of which is provided with a tapered expansion male thread; a lever provided with a lever screw hole, the lever screw hole being threaded to the lever male thread, the lever being reciprocatively swingable between a release position and an urge position under an externally applied force; an outer sleeve, axially provided with a sleeve hole for the inner shaft to pass through, an outer circumferential face of the outer sleeve being provided with a sleeve body, an abutting portion disposed on one end of the sleeve body and an expansion portion disposed on the other end of the sleeve body, the expansion portion being provided with a plurality of axially extending sectioned grooves; an urging unit, disposed between the lever and the abutting portion of the outer sleeve; and a tapered expansion unit, provided with a tapered expansion screw hole for threading to the tapered expansion thread of the inner shaft, an outer circumferential face of the tapered expansion unit being provided with a conical face; wherein when the lever is in the urge position, the tapered expansion unit is pulled to move towards an interior of the expansion portion, such that the conical face applies an outwards distraction force to increase an outer diameter of the expansion portion; and when the lever is in the release position, the tapered expansion unit is pulled to move towards an exterior of the expansion portion, such that the conical face stops applying the force to the expansion portion and hence the outer diameter of the expansion portion is restored. In this way, fewer parts are used, assembling is easy, and the parts may not be lost and different dimensions of parts may be used for replacement.

DETAILED DESCRIPTION

Figure 1:
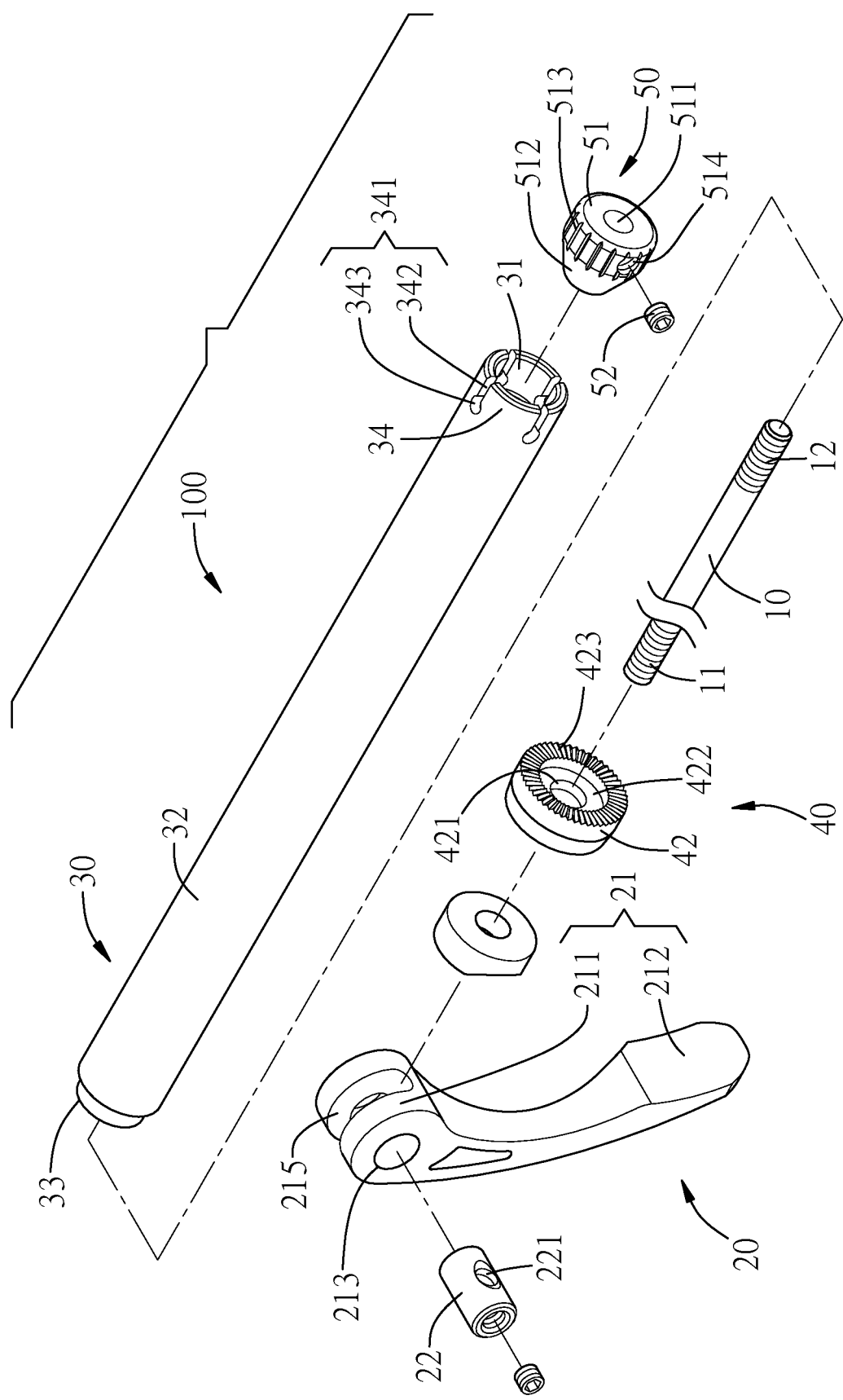
FIG. 1 is a three-dimensional exploded view of a bicycle quick release device according to an embodiment of the present disclosure.

For further interpretation and understanding of the features and characteristics of the present disclosure, hereinafter preferred embodiments are described with reference to the accompanying drawings.

Referring to FIG. 1 to FIG. 5, a bicycle quick release device 100 according to a preferred embodiment of the present disclosure is illustrated. The bicycle quick release device 100 mainly includes an inner shaft 10, a lever 20, an outer sleeve 30, an urging unit 40, and a tapered expansion unit 50.

Figure 2:
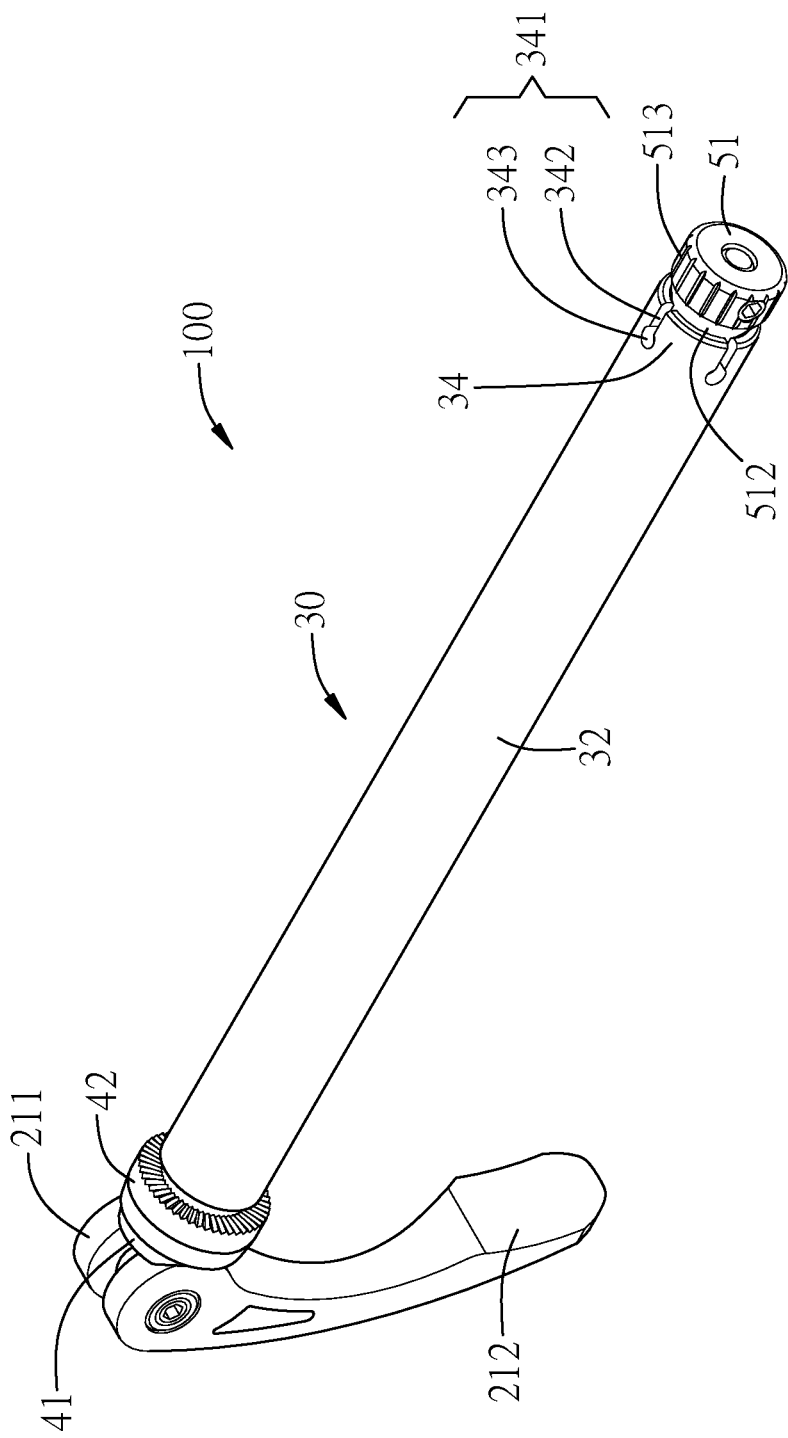
FIG. 2 is a three-dimensional assembled view of plan view of the bicycle quick release device according to the embodiment as illustrated in FIG. 1.
Figure 3:
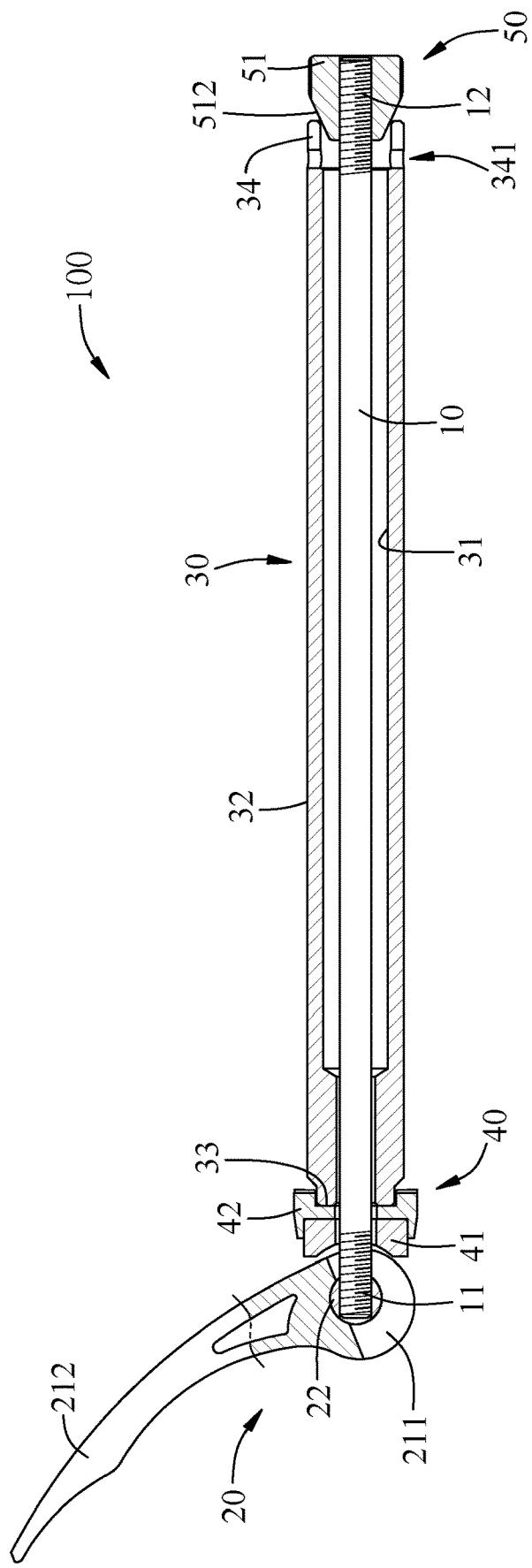
FIG. 3 is a combined perspective view of the bicycle quick release device according to the embodiment illustrated in FIG. 1.

Referring to FIG. 1 to FIG. 3, an outer circumferential face at one end of the inner shaft 10 is provided with a lever male thread 11, and an outer circumferential face at the other end of the inner shaft 10 is provided with a tapered expansion male thread 12.

Referring to FIG. 1 to FIG. 3, the lever 20 is provided with an eccentric lever body 21 and a hinge post 22.

The eccentric lever body 21 is provided with an eccentric portion 211 and a swinging portion 212 that is integrally connected to the eccentric portion 211. The eccentric portion 211 is provided with a hinge hole 213 passing through both sides of the eccentric portion 211. An outer circumferential face of the eccentric portion 211 is provided with a rotation groove 215 in communication with the hinge hole 213. The hinge post 22 is disposed in, and is rotatable about its circumferential axis within, the hinge hole 213. A lever screw hole 221 is defined on the hinge post 22. The lever male thread 11 of the inner shaft 10 passes through the rotation groove 215 and is threaded to the lever screw hole 221.

Referring to FIG. 1 to FIG. 3, the outer sleeve 30 is axially provided with a sleeve hole 31 for the inner shaft 10 to pass through. An outer circumferential face of the outer sleeve 30 is provided with a sleeve body 32, an abutting portion 33 disposed on one end of the sleeve body 32 and an expansion portion 34 disposed on the other end of the sleeve body 32. The expansion portion 34 is provided with a plurality of axially extending sectioned grooves 341. The sectioned groove 341 is in communication with the sleeve hole 31. Each sectioned groove 341 is defined by communication between a linear groove 342 and a circular groove 343. The linear groove 342 axially extends from an edge of the expansion portion 32 towards the interior of the expansion portion 32. The circular groove 343 is in communication with a tail end of the linear groove 342.

Referring to FIG. 1 to FIG. 3, the urging unit 40 is provided for the inner shaft 10 to pass through, and is disposed between the eccentric portion 211 of the lever 20 and the abutting portion 33 of the outer sleeve 30.

The urging unit 40 is provided with an urging block 41 and an abutting ring 42. The urging block 41 is elastic and provided with a perforation 411 for the inner shaft 10 to pass through. One end of the urging block 41 abuts against the eccentric portion 211 of the lever 20. The abutting ring 42 is provided with a through hole 421 for the inner shaft 10 to pass through. One end of the abutting ring 42 abuts against the urging block 41. The other end of the abutting ring 42 is recessively provided with an abutting groove 422 for abutting against the abutting portion 33 of the outer sleeve 30. An end face of the abutting ring 42 connected to the abutting groove 422 is provided with a ring tooth 423.

Referring to FIG. 1 to FIG. 3, the tapered expansion unit 50 is provided with a conical block 51 and a fastener 52.

A tapered expansion screw hole 511 is axially defined in the conical block 51 such that the tapered expansion male thread 12 of the inner shaft 10 is threaded to the tapered expansion screw hole 511. An outer circumferential face of the conical block 51 is provided with a conical face 512 and a rough face 513. The conical face 512 is defined by gradually increasing an outer diameter of the conical block 51 from the outer circumferential face at one end to the outer circumferential face at the other end. The rough face 513 is provided with a lock screw hole 514. The fastener 52 is threaded into the lock screw hole 514 and abuts against the tapered expansion male thread 12 to prevent the conical block 51 from detaching from (e.g. unscrewing from) the inner shaft 10.

Detailed above are the descriptions of the parts and assembling of these parts of the bicycle quick release device 100 according to some preferred embodiments of the present disclosure. Hereinafter, usage of the device is described as follows:

Before use of the bicycle quick release device according to the present disclosure, first, the lever 20 is swung to a release position. In this case, the conical face of the tapered expansion unit 50 does not apply a force to the expansion portion 34 of the outer sleeve 30. That is, in this case, the outer diameter of the expansion portion 34 is the same as the outer diameter of the sleeve body 32.

Figure 4:
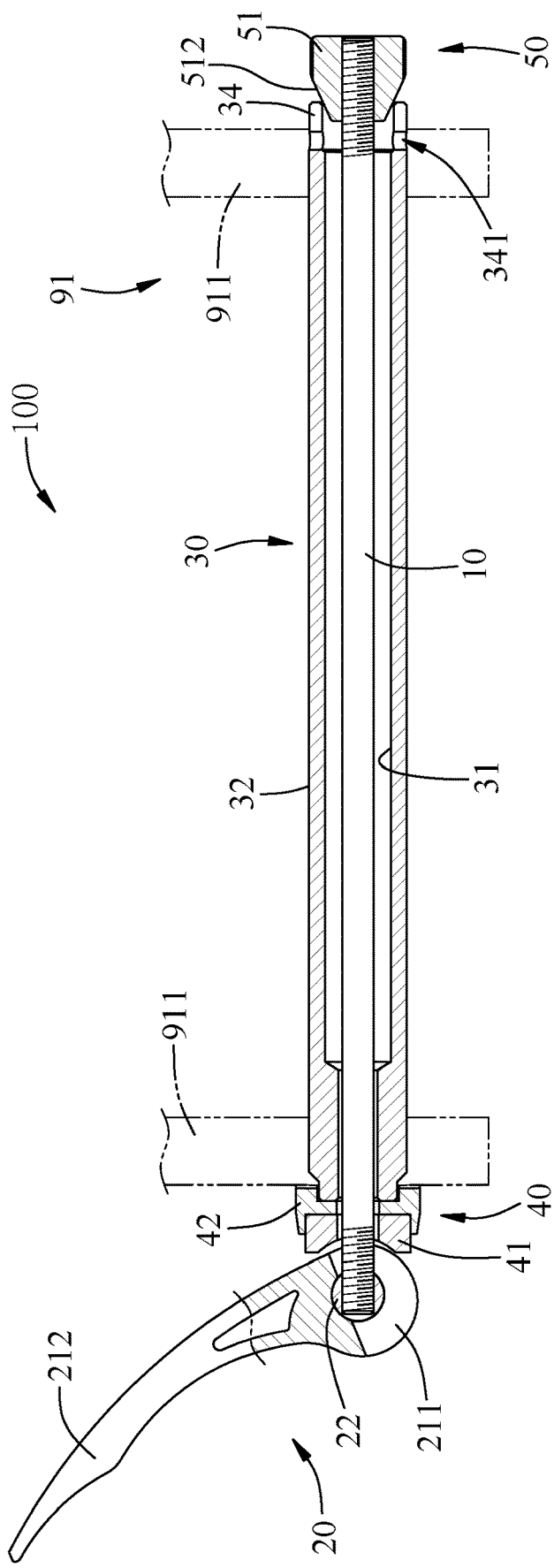
FIG. 4 is a schematic operation view of the bicycle quick release device according to the embodiment illustrated in FIG. 1.

The tapered expansion unit 50 and the outer sleeve 30 are directly inserted from two fork rods 911 of a fork body 91, and passed through a wheel body (not illustrated in the drawings) between the two fork rods 911, such that the tapered expansion unit 50 is disposed on an outer side of one of the fork rods 911, and the urging unit 40 and the lever 20 are disposed on an outer side of the other of the fork rods 911 (as illustrated in FIG. 4).

Figure 5:
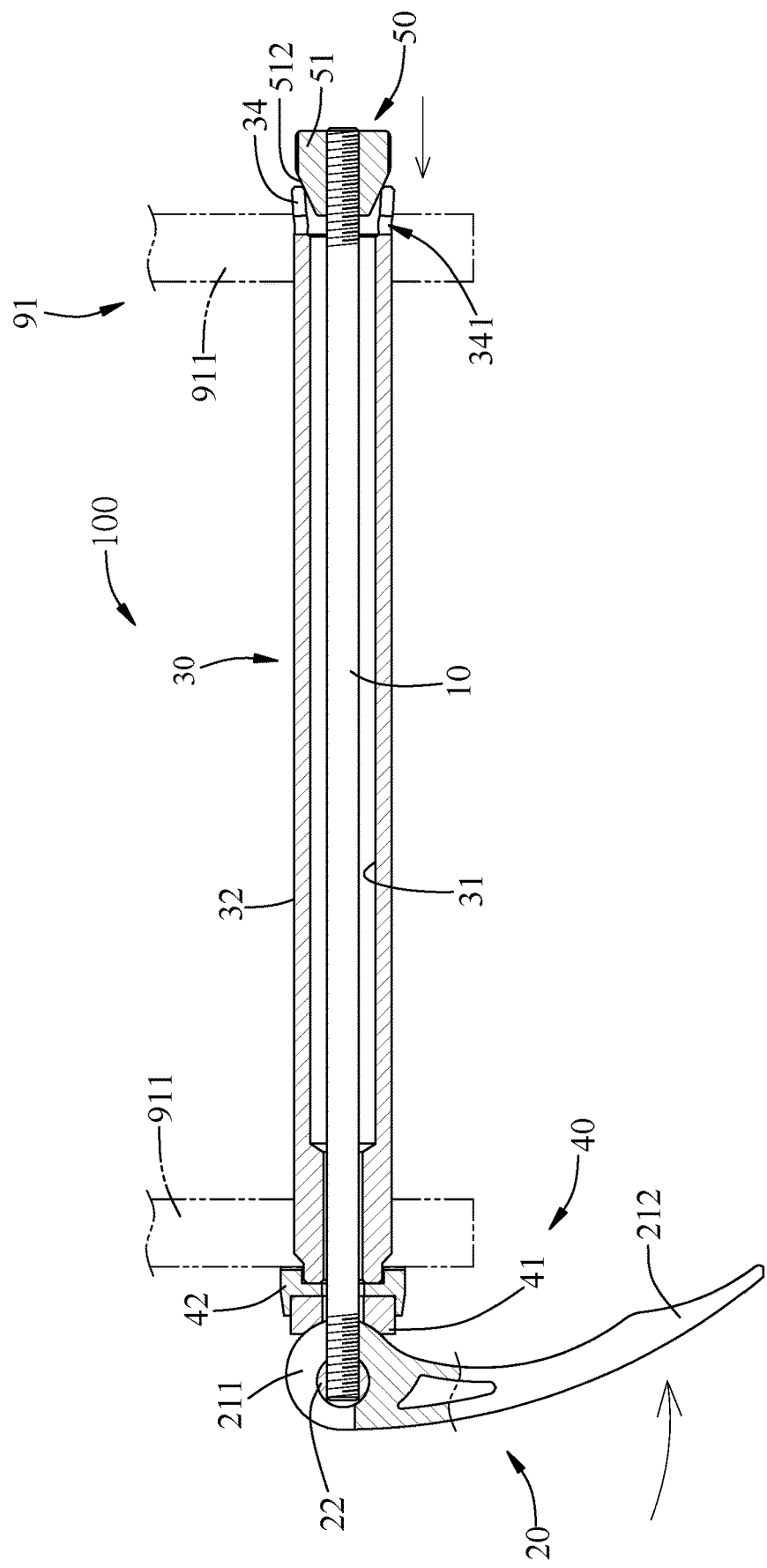
FIG. 5 is a schematic operation view of the bicycle quick release device according to the embodiment illustrated in FIG. 1.

Afterwards, the lever 20 is swung to an urging position. In this case, the lever 20 pulls the inner shaft 10 and the tapered expansion unit 50, such that the conical block 51 of the tapered expansion unit 50 extends into the interior of the outer sleeve 30, and thus the conical face 512 applies an outward distraction force to the expansion portion 34 such that the expansion portion 34 disposed on the edge of the sectioned groove 341 is deformed outward to increase the outer diameter thereof (as illustrated in FIG. 5). In this case, the outer side of one of the fork rods 911 is pressed tightly against by the abutting ring 42 of the urging unit 40, and the outer side of the other of the fork rods 911 is pressed tightly against by the expansion portion 34 with the outer diameter thereof increased, such that the device according to the present disclosure is engaged with the fork body 91, to quickly engage the wheel body to the fork body.

Before separation of the wheel body from the fork body, the lever only needs to be swung to the release position, such that the tapered expansion unit stop applying the force to the expansion portion, and thus the outer diameter of the expansion portion is restored. In this way, the two fork rods may be directly pulled out with no need to disassemble the device according to the present disclosure, and hence quick release of the bicycle is achieved.

According to the present disclosure, during engagement and separation between the device and the fork body, no part needs to be disassembled or removed. In this way, loss of parts may be prevented, and in addition, the operations are simple, the parts are fewer, the assembling is simple, and the tension may be easily controlled.

Second, according to the present disclosure, the dimension of the outer sleeve may be changed. For example, a 12-mm outer sleeve may be exchangeable with a 15-mm outer sleeve to adapt to fork bodies with different specifications. In this way, the present disclosure achieves good adaptability, and users' costs are lowered.

Described above are merely preferred examples of the present disclosure, but are not intended to limit the scope of the present disclosure. Persons of relative skills in the art would derive other equivalent variations from the present disclosure, and these variations shall be considered as falling within the scope of the present disclosure.

What is claimed is:

1. A bicycle quick release device, comprising:
an inner shaft, one end of which comprises a first threaded portion and the other end of which comprises a second threaded portion;
a lever comprising a first screw hole, the first screw hole being threaded to the first threaded portion, the lever being movable between a release position and an urge position under an externally applied force;
an outer sleeve, the outer sleeve axially comprising a sleeve hole for the inner shaft to pass through, an outer circumferential face of the outer sleeve comprising a sleeve body, an abutting portion disposed on one end of the sleeve body and an expansion portion disposed on the other end of the sleeve body, the expansion portion comprising a plurality of axially extending sectioned grooves, an outer diameter of the abutting portion being less than an outer diameter of the sleeve body;
an urging unit, disposed between the lever and the abutting portion of the outer sleeve, the urging unit comprising an urging block and an abutting ring, the urging block being elastic and comprising an opening for the inner shaft to pass through, one end of the urging block abutting against the lever, the abutting ring comprising a through hole for the inner shaft to pass through, one end of the abutting ring abutting against the urging block, the other end of the abutting ring comprising a recessed abutting groove for abutting against the abutting portion of the outer sleeve such that at least a portion of the abutting portion is disposed within the abutting ring and abutting against the abutting groove, an end face of the abutting ring opposite the urging block and connected to the abutting groove radially extending beyond the sleeve body and comprising plurality of teeth; and a tapered expansion unit, the tapered expansion unit comprising a second screw hole for engaging with the second threaded portion of the inner shaft, an outer circumferential face of the tapered expansion unit comprising a conical face;

wherein when the lever is in the urge position, the tapered expansion unit is pulled to move towards an interior of the expansion portion, such that the conical face applies an outward urging force to increase an outer diameter of the expansion portion; and when the lever is in the release position, the tapered expansion unit is moved away from the interior of the expansion portion, such that the conical face stops applying the outward urging force to the expansion portion.

2. The bicycle quick release device according to claim 1, wherein the lever comprises an eccentric lever body and a hinge post, the eccentric lever body comprising an eccentric portion and a swinging portion that is integrally connected to the eccentric portion, the eccentric portion comprising a hinge hole passing through opposite sides of the eccentric portion, an outer circumferential face of the eccentric portion comprising a rotation groove in communication with the hinge hole;

wherein the hinge post is is rotatably disposed in the hinge hole, the first screw hole is defined on the hinge post, and the first threaded portion of the inner shaft passes through the rotation groove and is threaded onto the first screw hole.

3. The bicycle quick release device according to claim 1, wherein each of the sectioned grooves is in communication with the sleeve hole.

4. The bicycle quick release device according to claim 1, wherein each sectioned groove comprises a linear groove and a circular groove, the linear groove axially extending from an edge of the expansion portion towards the interior of the expansion portion, and the circular groove in communication with a tail end of the linear groove.

5. The bicycle quick release device according to claim 1, wherein the tapered expansion unit comprises a conical block and a fastener; and the second screw hole is axially defined in the conical block, the conical face is defined on an outer circumferential face of the conical block, and the conical face comprises an axially increasing outer diameter from the outer circumferential face at one end towards the outer circumferential face at the other end, the outer circumferential face of the conical block comprising a rough face, the rough face comprising a lock screw hole, and the fastener threadedly engaging the lock screw hole and abutting against the second threaded portion.

\* \* \* \* \*